United States Patent [19]
Noda

[11] 3,854,172
[45] Dec. 17, 1974

[54] CLAMP ASSEMBLY FOR STEEL CORE ALUMINUM STRANDED WIRES

[75] Inventor: Hiroshi Noda, Tokyo, Japan

[73] Assignee: Sanwa Tetsuki Kougiyou Kabushiki Kaisha, Tokyo, Japan

[22] Filed: Nov. 10, 1972

[21] Appl. No.: 305,508

Related U.S. Application Data

[62] Division of Ser. No. 186,719, Oct. 5, 1971, Pat. No. 3,769,685.

[52] U.S. Cl............ 24/122.3, 24/115 A, 24/115 R, 403/285, 403/300, 339/272 A
[51] Int. Cl....................... F16g 11/02, F16g 11/06
[58] Field of Search............ 24/122.3, 122.6, 115 A; 29/517; 287/75, 78; 339/272 A

[56] References Cited
UNITED STATES PATENTS

| | | | |
|---|---|---|---|
| 1,732,581 | 10/1929 | Johnson | 24/122.6 |
| 1,793,293 | 2/1931 | Varney | 24/115 A |
| 1,936,185 | 11/1933 | Brenizer | 24/115 A |
| 2,259,261 | 10/1941 | Miller | 287/75 |
| 2,727,720 | 12/1955 | Barth | 287/75 |
| 2,997,522 | 8/1961 | Schneider | 287/75 |
| 3,184,535 | 5/1965 | Worthington | 287/75 |
| 3,435,512 | 4/1969 | MacRobbie | 29/517 |

Primary Examiner—Bernard A. Gelak
Attorney, Agent, or Firm—Holman & Stern

[57] ABSTRACT

A clamp for steel core aluminum stranded wires by including a steel core wire inserted into a steel core wire receiving hole formed in a steel sleeve and provided with a plurality of axial slits on the outer wall of the hole, the sleeve having a through screw hole direction to the axis near the base of the slits, a push or machine screw screwed into the above-mentioned screw hole pressing the steel core wire with the tip so that the head of the screw is hidden in the screw hole, pressing the steel core wire with the tip so that the head of the screw is hidden in the screw hole, the steel sleeve being enclosed in a cylindrical part of an aluminum sleeve into which it is inserted with a slight clearance, and the aluminum sleeve being compressed on the outer periphery of the steel sleeve.

1 Claim, 4 Drawing Figures

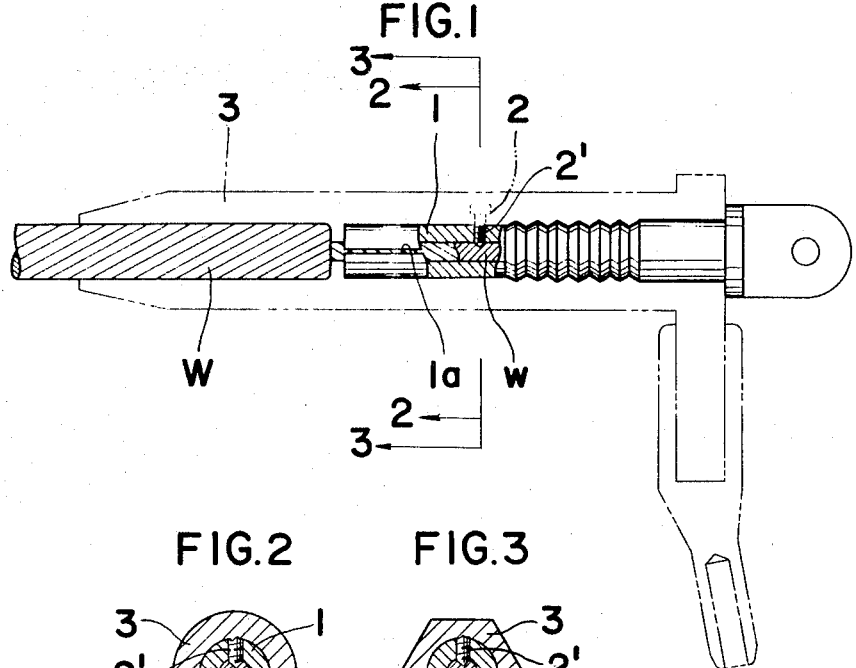
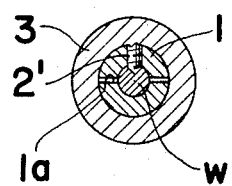
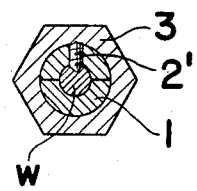
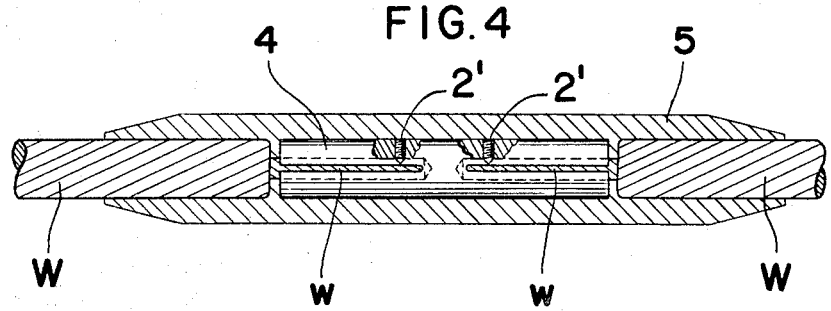

CLAMP ASSEMBLY FOR STEEL CORE ALUMINUM STRANDED WIRES

This is a divisional, of application Ser. No. 186,719, filed Oct. 5, 1971, now U.S. Pat. No. 3,769,685.

SUMMARY OF THE INVENTION

A clamp for steel core aluminum stranded wires comprising a steel sleeve provided with a plurality of axial slits on the outer wall of a sleeve-bore of the sleeve for receiving a steel core wire and having a through screw hole directed to the axis near the base of the slits, a push or machine screw which can be screwed into the above mentioned screw hole so that the head of the screw may be hidden in the outer periphery of the steel sleeve and a cylindrical aluminum sleeve into which the above mentioned steel sleeve can be inserted by leaving a slight clearance and which can be compressed on the outer periphery.

BACKGROUND OF THE INVENTION

There is known such method of clamping steel core aluminum stranded wires as with an anchor clamp or a straight sleeve.

BRIEF DESCRIPTION OF THE DRAWING

FIG. 1 is an elevational view used in an anchor clamp with portions broken away for clarity.

FIGS. 2 and 3 are sections taken on lines 1—1 and 2—2 of FIG. 1, respectively, before and after the sleeve compression and showing the lock or push screws with the heads removed.

FIG. 4 is an elevational view, partially sectioned, showing a straight sleeve.

DESCRIPTION OF THE PREFERRED EMBODIMENTS

First of all, the case of an anchor clamp shall be described with reference to the drawings. According to FIG. 1, the present invention, a steel sleeve 1 has a hole or base for inserting a steel core wire $w$ of a steel core aluminum stranded wire W therein; the sleeve includes, a plurality of axial slits $1a$ formed in the outer wall of the bore. A through screw hole radially directed to the axis of the bore is made near the base of the slits and a push screw 2 is screwed into the through screw hole. The steel core aluminum stranded wire to be clamped has its aluminum core part on the outer periphery at the end portion stripped off and has the exposed steel core wire $w$ inserted into the inserting hole of the steel sleeve to the bottom of the bore. This inserting hole is coated in advance with a compound mixed with abrasive particles such as of carborundum so that the frictional force of the inserted steel core wire may be increased. Then the push or machine screw 2 is run down so as to bite at its tip into the steel core wire. For this purpose, as required, a push screw may be used which is exposed with the head projecting out of the steel sleeve after it is fully run down as shown in FIG. 1 then it is further strongly rotated so that the head (shown in phantom) twisted or sheared off. The screw will then be entirely hidden in the screw hole after it is completely screwed in i.e., it will be below the periphery of the sleeve. Then this steel sleeve 1 is inserted into a cylindrical bore of an aluminum sleeve 3. This hole is so designed as to leave only a slight clearance between it and the steel sleeve. After the insertion, the aluminum sleeve is compressed on the outer periphery from the end on the push screw side to the other end in turn so that the three members of the aluminum sleeve, steel sleeve and steel core aluminum stranded wire are integrated as a secured unit. Since the push screw 2 bites at the tip into the steel core wire, there is no danger that, in case the aluminum sleeve is compressed, the steel core wire will come out of the sleeve accidentally. The steel sleeve is provided with a flexibility with the slits or compressibility and will strongly grip the steel core wire with this compression $1a$. That is to say, with only one compression, the above mentioned three members are assembled as a single strongly integral unit.

Conventional steel sleeve are not provided with the above mentioned slits $1a$. Such steel sleeve, as in the invention, are compressed to grip the steel core wire after it is inserted into the sleeve. By this compression, the steel sleeve 2' will be bent and a bend correcting step may be required. During such a step, the reduction of the gripping force for the steel sleeve is unavoidable. Even if such bend is corrected, in order that the steel sleeve may be reasonably inserted into the aluminum sleeve, it may be necessary to provide a proper clearance between them. It is considered necessary to insert a collar for filling the clearance or to wind a wire on the outer periphery of the steel sleeve before the aluminum sleeve is compressed.

On the other hand, in the present invention, no steel sleeve compressing step is necessary. The steel sleeve has no space for generating bends. When the steel sleeve is inserted into the aluminum sleeve and the aluminum sleeve is compressed, the three members are made strongly integral as mentioned above. It is a feature of the present invention that problems of compressing the steel sleeve and the disadvantage accompanying it are eliminated as in the above.

In the above, an anchor clamp has been described as an example. However, the present invention can be utilized also in a straight sleeve 5 as in FIG. 4 in exactly the same manner. It is only different in that, in a strain clamp, the electric wire W is inserted only in one direction, whereas, in a straight sleeve, the steel core wires $w$ are inserted opposed to each other from both ends of the steel sleeve 4.

What is claimed is:

1. A compressable clamp assembly for steel core aluminum stranded wires comprising a steel sleeve having an axial bore and provided with a plurality of axial slits through the outer wall and communicating with the bore partially along the length thereof for permitting the sleeve to be radially compressed; a steel core wire inserted in the bore; a through screw hole directed to the axis of the sleeve near the base of the slits, a machine screw driven radially into the screw hole into locked engagement at an inner end with the screw being hidden beneath the outer periphery of the steel sleeve wall; and a cylindrical aluminum sleeve telescoped over the steel sleeve and hidden screw and deformably compressed onto the outer periphery of and comprising the steel sleeve at the axial slots onto the steel core wire and maintaining the screw in locked engagement with the core wire.

* * * * *